United States Patent
Blendermann et al.

[11] Patent Number: 6,094,605
[45] Date of Patent: Jul. 25, 2000

[54] VIRTUAL AUTOMATED CARTRIDGE SYSTEM

[75] Inventors: Stephen H. Blendermann; Alan Ray Sutton, both of Boulder; Robert Raicer, Niwot; L. Michael Anderson, Arvada; Clayton E. Ruff, Longmont; William G. Kefauver, Boulder, all of Colo.

[73] Assignee: Storage Technology Corporation, Louisville, Colo.

[21] Appl. No.: 09/110,217

[22] Filed: Jul. 6, 1998

[51] Int. Cl.[7] ........................................ G06F 7/00
[52] U.S. Cl. .......................... 700/214; 711/111; 709/213
[58] Field of Search .......................... 700/214; 711/111, 711/147; 709/213; 369/30, 34

[56] References Cited

U.S. PATENT DOCUMENTS

| | | | |
|---|---|---|---|
| 4,467,421 | 8/1984 | White | 364/200 |
| 4,792,898 | 12/1988 | McCarthy et al. | 364/200 |
| 5,164,909 | 11/1992 | Leonhardt et al. | |
| 5,287,459 | 2/1994 | Gneiwek | 395/275 |
| 5,317,728 | 5/1994 | Tevis et al. | 395/600 |
| 5,388,260 | 2/1995 | Monahan et al. | 395/600 |
| 5,455,926 | 10/1995 | Keele et al. | 395/404 |
| 5,548,724 | 8/1996 | Akizawa et al. | 395/200.03 |
| 5,623,669 | 4/1997 | Kincaid | 395/621 |
| 5,742,789 | 4/1998 | Ofer et al. | 395/438 |
| 5,752,268 | 5/1998 | Shimizu et al. | 711/162 |
| 5,805,538 | 9/1998 | Kamada et al. | 369/34 |
| 5,805,864 | 9/1998 | Carlson et al. | 395/500 |
| 5,829,046 | 10/1998 | Tzelnic et al. | 711/162 |
| 5,926,649 | 7/1999 | Ma et al. | 395/826 |
| 5,953,350 | 9/1999 | Higgins | 370/524 |
| 5,960,451 | 9/1999 | Voigt et al. | 711/114 |

*Primary Examiner*—Christopher P. Ellis
*Assistant Examiner*—Khoi H. Tran
*Attorney, Agent, or Firm*—Brooks & Kushman P.C.

[57] ABSTRACT

The present invention provides a virtual automated cartridge system (ACS) and data storage device management method which incorporates a temporary data buffer arrangement between multiple user systems and conventional physical data storage devices. The temporary data buffer arrangement emulates a compatible physical data storage device when accessed by each of the user systems, but allows simultaneous allocation of different users to access to read and write data to the temporary data buffer. A control processor automatically transfers data stored in the temporary data buffer arrangement to one of the physical data storage devices when allocation to a user has ended.

9 Claims, 1 Drawing Sheet

VIRTUAL AUTOMATED CARTRIDGE SYSTEM

TECHNICAL FIELD

The present invention relates generally to automated cartridge systems (ACS) or automated library systems, and more specifically, to an improved ACS arrangement which eliminates user monopolization of a tape drive in the ACS system.

BACKGROUND ART

Generally, conventional automated cartridge systems (ACS) allow multiple users in a data processing system common access to multiple data storage subsystems. However, due to the operational nature of the data storage subsystems, conventional ACS arrangements can only provide such common access via a serial access data control.

More specifically, whenever a user is performing a task which may require need of a storage/tape device, the user sends a request to a host computer control system. Upon receipt of such a request, the operating system must grab the storage device and allocate the device to the requesting user for the duration of the entire task irrespective of the amount of use actually made by the user.

Because such user monopolization denies allocation requests from other users while a resource is already allocated, storage device allocation and use in conventional ACS arrangements is highly inefficient. This in turn significantly lowers throughput capability of systems which may otherwise be capable of high speed processing.

DISCLOSURE OF THE INVENTION

It is therefore an object of the present invention to provide an improved ACS and data storage device management method which does not require user monopolization of a storage device when allocating the device to a user.

It is another object of the present invention to provide an ACS and data storage device management method which provides an intermediary subsystem arranged to automatically emulate a storage device when allocated to a user, wherein the intermediary subsystem is arranged to allow multiple simultaneous user access/allocation of data storage capability.

It is still another object of the present invention to provide a virtual ACS and data storage device management method which operates as a temporary storage device while giving the appearance of a conventional "physical" storage device in an ACS to a requesting user.

It is still another object of the present invention to provide an ACS and data storage device management method which provides an intermediary subsystem arranged to automatically emulate a compatible storage device when allocated to a user, thereby allowing any type or format of physical storage to be used in conjunction with remote computer systems irrespective of compatibility.

In accordance with these and other objects, the present invention provides a virtual ACS and data storage device management method which incorporates a temporary data buffer arrangement between multiple user systems and any type of conventional physical data storage devices, wherein the temporary data buffer arrangement is arranged to emulate a physical data storage device when accessed by each of the user systems, while also allowing multiple users simultaneous access to read and write data to the temporary data buffer. The system includes a control processor arranged to periodically transfer any data in the temporary data buffer arrangement to one of the physical data storage devices.

In accordance with one aspect of the present invention, a virtual automated cartridge system is provided including a data storage manager having a first input/output connected to at least one remote user computer system, and a second input/output connected to at least one physical data storage device, and an interim data storage device connected to the data storage manager and arranged to emulate a physical data storage with respect to storing or retrieving data for the at least one remote user computer system. The data storage manager includes a processor operative to assign a portion of the interim data storage device to a user computer system upon receipt of a user request for allocation of a data storage device for a duration of time.

In accordance with another aspect of the present invention, a method for efficiently managing allocation of at least one physical data storage device in an automated cartridge system to competing remote user computer systems includes providing an interim data storage device which is arranged to emulate a physical data storage with respect to storing or retrieving data for a remote user computer system, and assigning a first portion of the interim data storage device in lieu of the at least one physical data storage device upon receiving a request from a remote user computer system for allocation of a data storage device for a duration of time.

These and other objects, features, and advantages of the present invention will be readily apparent from the following detailed description of the best mode for carrying out the invention when taken in connection with the accompanying drawings.

BEST MODE FOR CARRYING OUT THE INVENTION

Figure 1:
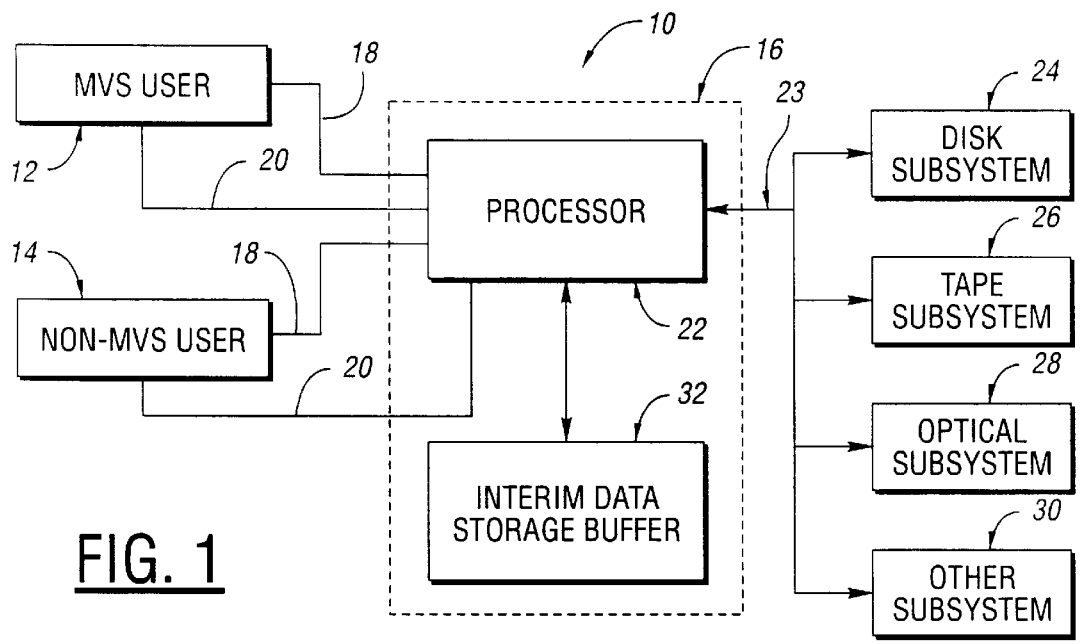
FIG. 1 is a block diagram of data storage management system in accordance with the present invention.

Referring to FIG. 1, a data storage management system 10 is shown having a plurality of user subsystems denoted for illustrative purposes as multiple virtual storage (MVS) type systems 12 and non-MVS type systems 14, each of which are conventional and well understood to one of ordinary skill in the art, connected to a storage manager 16 via respective data lines 18 and control lines 20. Storage manager 16 includes a suitable processor 22 programmed to provide the necessary control process to implement the "virtual" data storage of the present invention, and provides an intermediary data storage control point via on input/output 23 for a plurality of physical data storage devices represented as disk subsystems 24, tape subsystems 26, optical subsystems 28, and other types of data storage subsystems 30.

As further shown in FIG. 1, storage manager 16 also includes an interim/temporary data buffer storage device 32 which is utilized by storage manager 16 as a virtual disk or tape device when access to a physical storage subsystem is requested by a user. A request for access to a physical storage subsystem may be a request for one of the subsystems 24–30 actually used in system 10, however this is not a requirement because the use of a virtual disk in lieu of an actual physical storage media in accordance with the present invention allows storage manager 16 to receive user requests for any type of storage subsystem whether connected to system 10 or not. Interim data buffer storage device 32 can be implemented as a high speed buffer arrangement, such as using solid state memory, DASD or any other suitable data storage arrangement capable of multiple, simultaneous user access.

Figure 2:
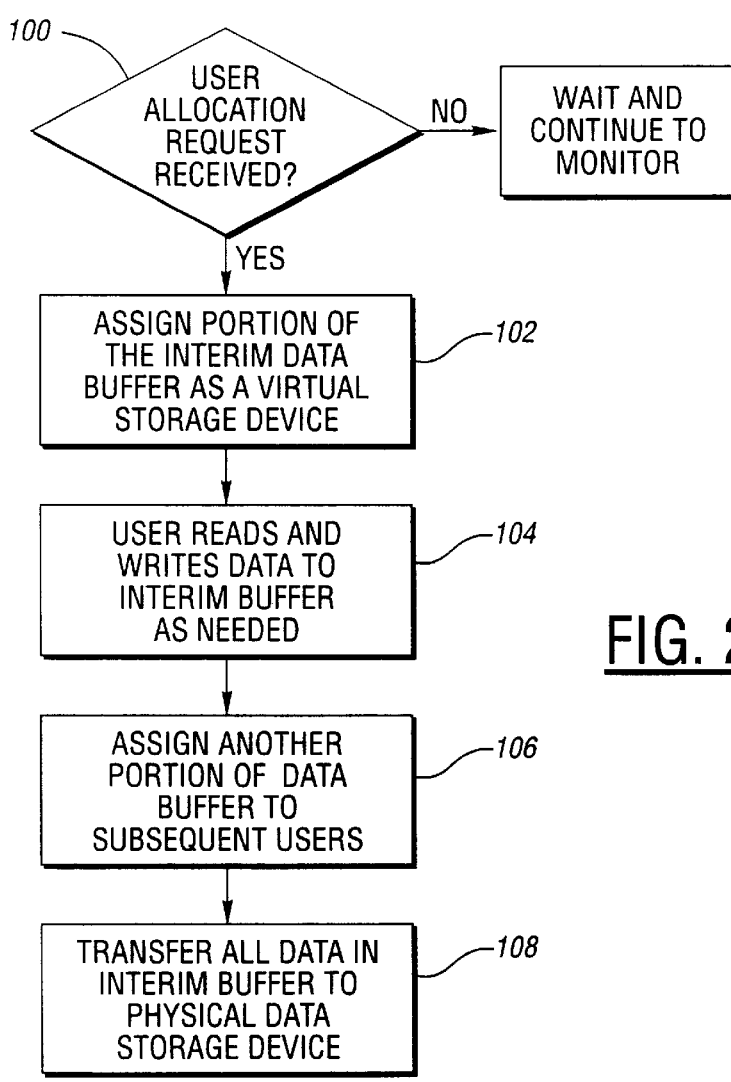
FIG. 2 is a flow chart showing the virtual ACS process in accordance with the present invention.

Overall operation of the virtual data storage management process of the present invention will now be described in connection with the flow chart of FIG. 2. More specifically, as denoted by decision block 100, processor 22 determines that a request has been received from a user seeking allocation of a physical storage subsystem. In response, processor 22 initially assigns at block 102 a portion of interim data buffer 32 for allocation to the requesting user. Upon set up, the allocated user will believe an actual physical storage subsystem device has been reserved, and will proceed to read and write data as indicated by the particular application currently being executed as indicated at block 104. As denoted by block 106, multiple users are queued and assigned different portions of interim data buffer 32. The assigned portions of interim data buffer 32 are arranged in accordance with known design principles to react like or emulate operation of a compatible data storage device, such as one of the actual physical data storage devices in subsystems 24–30.

Because the buffer is designed to emulate a storage device compatible with the user request as viewed by the remote user, compatibility between the remote user and the actual type or format of physical data storage device is not required. Thus, the present invention advantageously allows any type of physical storage device to be used or added as an upgrade to an existing system. The interim buffer management arrangement would be modified to include an appropriate translation arrangement to allow data to be transferred between the buffer and the actual type of storage device employed.

As denoted at block 108, all data of the virtual volume in the interim data buffer 32 associated with the file of interest is transferred to one of the storage subsystems in such situations as the end of a user's current allocation, a filling up of memory capability in buffer 32, or periodically as part of an overall housekeeping process.

In addition, after interim data has been transferred to one of the actual physical storage subsystems, such data can be later retrieved back into the interim buffer as a virtual volume when desired by the user. After retrieval, the storage manager 16 again causes the buffer to emulate the requested type of physical storage subsystem to make the retrieved data available to the user.

With such an arrangement, the present invention advantageously provides the illusion of a compatible tape or cartridge device, while further providing significantly improved data management flexibility and efficiency in data storage device use.

While the best mode for carrying out the invention has been described in detail, those familiar with the art to which this invention relates will recognize various alternative designs and embodiments for practicing the invention as defined by the following claims.

What is claimed is:

1. A virtual automated cartridge system for connection to at least one remote user computer system and at least one physical data storage device, wherein the at least one remote user is arranged to request allocation of data storage space, said virtual automated cartridge system comprising:

a data storage manager having an input/output connected to the at least one remote user computer system, and an input/output connected to the at least one physical data storage device; and an interim data storage device connected to said data storage manager and arranged to emulate a type of data storage device compatible with a user allocation request received from the at least one remote user computer system irrespective of an actual type of storage device used as the at least one physical storage device, wherein said data storage manager comprises a processor operative to assign for a duration of time a portion of the interim data storage device to a user computer system upon receipt of a user request for allocation of data storage.

2. The system of claim 1 wherein said processor is further operative to periodically transfer data stored in the interim data storage device to the at least one physical data storage device.

3. The system of claim 1 wherein said processor is further operative to automatically transfer any data stored in the interim data storage device associated with a file of interest to the at least one physical data storage device at the end of assigned duration of time.

4. The system of claim 1 wherein said processor is further operative to simultaneously assign a different portion of the interim data storage device to a subsequent remote user computer system.

5. The system of claim 1 wherein said interim data storage device comprises a high speed buffer memory.

6. A method for efficiently managing allocation of at least one physical data storage device in an automated cartridge system to competing remote user computer systems, said method comprising:

providing an interim data storage device which is arranged to emulate a physical data storage device with respect to storing or retrieving data for a remote user computer system; and assigning a first portion of the interim data storage device for a duration of time in lieu of the at least one physical data storage device upon receiving a request from a remote user computer system for allocation of a physical data storage device.

7. The method of claim 6 further comprising periodically transferring data stored in the interim data storage device to the at least one physical data storage device.

8. The method of claim 6 further comprising automatically transferring any data stored in the interim data storage device associated with a file of interest to the at least one physical data storage device at the end of assigned duration of time.

9. The method of claim 6 further comprising assigning any other requesting remote user computer systems to a respective different portion of the interim data storage device such that multiple users can be simultaneously allocated.

* * * * *